United States Patent [19]
Kawakubo et al.

[11] Patent Number: 5,972,459
[45] Date of Patent: Oct. 26, 1999

[54] OPTICAL RECORDING MEDIUM AND OPTICAL DISK APPARATUS

[75] Inventors: Osamu Kawakubo, Saitama; Toshiyuki Kashiwagi, Tokyo; Koichi Yasuda; Masahiko Kaneko, both of Kanagawa; Mitsuo Naito, Chiba; Motohiro Furuki, Tokyo, all of Japan

[73] Assignee: Sony Corporation, Tokyo, Japan

[21] Appl. No.: 09/063,328

[22] Filed: Apr. 20, 1998

[30] Foreign Application Priority Data

Apr. 25, 1997 [JP] Japan .................................... 9-109661

[51] Int. Cl.$^6$ ....................................... B32B 3/00
[52] U.S. Cl. ...................... 428/64.1; 428/64.4; 428/64.5; 428/64.6; 428/913; 430/270.13; 430/495.1; 430/945; 369/275.1; 369/283; 369/288
[58] Field of Search ................................. 428/64.1, 64.2, 428/64.4, 64.5, 64.6, 688, 702, 913; 430/270.13, 495.1, 945; 369/275.1, 283, 288

[56] References Cited

U.S. PATENT DOCUMENTS 5,506,022  4/1996  Ide ......................................... 428/64.1
5,652,036  7/1997  Kobayashi ............................. 428/64.1

*Primary Examiner*—Elizabeth Evans
*Attorney, Agent, or Firm*—Frommer Lawrence & Haug, LLP.; William S. Frommer

[57] ABSTRACT

An optical recording medium is provided which achieves a higher recording capacity. This optical recording medium includes a base formed of thermoplastic resin which has a thickness ranging from between approximately 0.3 to 1.2 nm, a guide groove formed on the base, at least a reflective film and a phase-change recording layer successively formed on the guide groove, arid a light transmissive layer having a thickness ranging from between approximately 3 to 177 $\mu$m. In this optical recording medium, the unevenness $\Delta t$ of the thickness of the light transmission layer is set within the range of:

$$\Delta t \leq \pm 5.26(\lambda/\text{N.A.}^4)(\mu m)$$

wherein N.A. represents a numerical aperture of an optical head device of the optical disk recording and/or reproducing apparatus and $\lambda$ represents the wavelength of laser light utilized by the optical disk recording and/or reproducing apparatus.

20 Claims, 14 Drawing Sheets

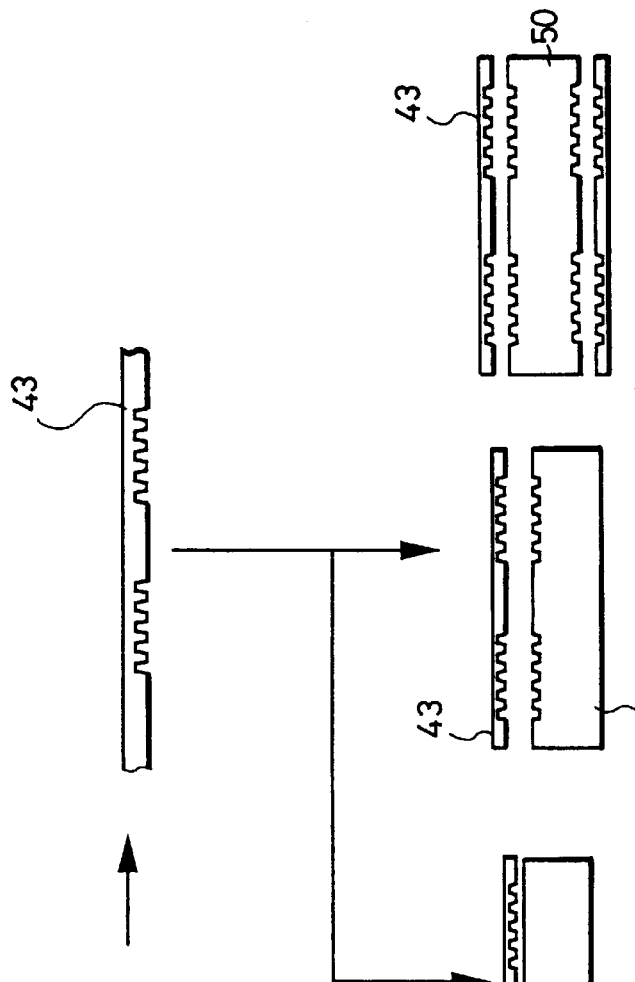
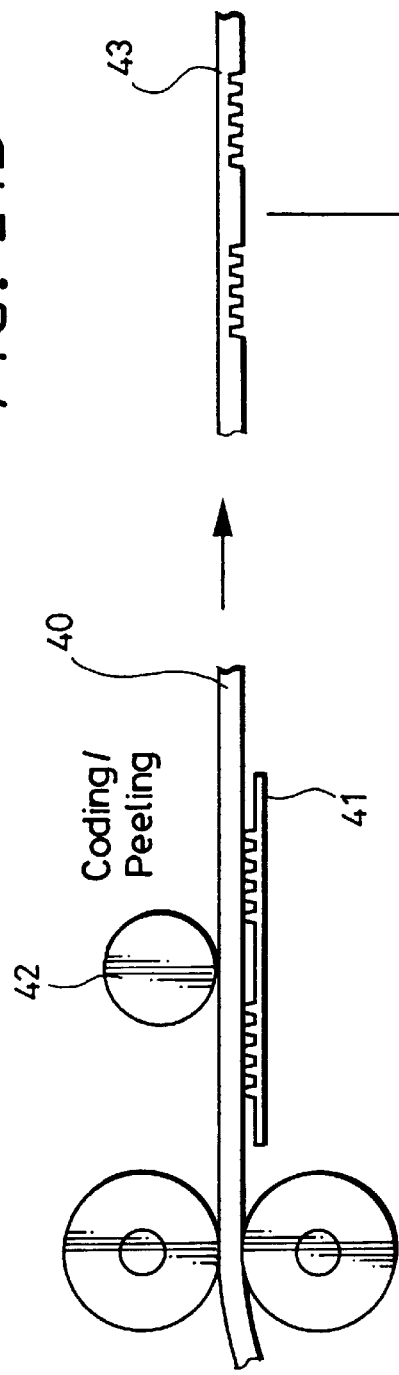
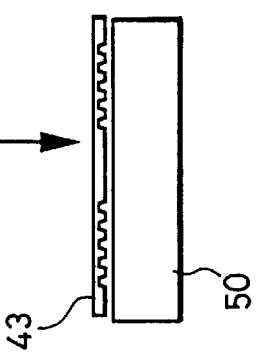

OPTICAL RECORDING MEDIUM AND OPTICAL DISK APPARATUS

FIELD OF THE INVENTION

The present invention relates to an optical recording medium having a guide groove formed on a main surface of a base (i.e, a substrate), a reflective film, a phase-change recording layer, and a light transmissive layer where information is read therefrom or recorded thereon by irradiation of light. More particularly, the present invention relates to an optical recording medium which achieves higher storage capacity by determining a relationship between the thickness of the light transmissive layer, the thickness unevenness, and a skew (a bend or a warp) of the disk. The present invention further relates to an optical disk apparatus for recording and/or reproducing the optical recording medium.

BACKGROUND OF THE INVENTION

An optical recording medium capable of recording and/or reproducing NTSC signal data of up to four hours on one side thereof has been proposed for optical discs of the next generation. This proposed optical recording medium allows a home-use video disk recorder to record and reproduce data for up to four hours, thereby functioning as a new recording medium which can be replaced with a cassette used in a current video cassette recorder (VCR).

Since the above optical recording medium has the same shape and size as a compact disc (CD), even a user accustomed to easy handling and operability of a CD will feel similar ease in use of this medium. Moreover, if the fast access feature of this optical recording medium is utilized, an optical disc apparatus is provided which not only serves as a small-sized and easily operable :recorder but also has various functions such as video recording, playback, a trick play, edition, etc. that can be performed instantaneously.

It has been found that such an optical disk apparatus requires an optical disk medium having a storage capacity of at least 8 GB or more. However, optical recording mediums currently available do not have storage capacities of 8 GB or more.

A digital versatile disc (DVD) only has a storage capacity of 4.7 GB (ROM) when a wavelength $\lambda$ is 0.65 $\mu$m and a numerical aperture (N.A.) is 0.6.

If a higher storage capacity is desired without any change of signal format, such as an error correction code (ECC), a modulation system or the like, establishment of the following equation (1) is required for obtaining of a storage capacity of 8 GB or more.

$$4.7 \times (0.65/0.60 \times N.A./\lambda)^2 \geq 8 \qquad (1)$$

According to the above equation (1), $N.A./\lambda \geq 1.20$ must be established. As a result, it is therefore necessary to set the wavelength $\lambda$ of the laser light utilized by the optical disk apparatus shorter or to set the N.A. higher wherein N.A. represents the numerical aperture of an optical head device of the optical disk apparatus.

In order to satisfy the above condition, if the value of N.A. is set higher, it is necessary to decrease the thickness of the light transmissive layer of the optical recording medium through which irradiated reproduction light is transmitted. This reduced thickness is necessary to compensate for a consequent reduction in the allowance for a tilt angle wherein the disk surface is displaced from a surface perpendicular to the optical axis of the optical pickup. Specifically, the tilt angle is easily affected by optical aberrations resulting from the thickness of the base of the optical recording medium.

For a similar reason, unevenness of the thickness of the light transmissive layer must be reduced to no more than a predetermined value.

OBJECTS AND SUMMARY OF THE INVENTION

Therefore, it is an object of the present invention to provide an optical recording medium which avoids the aforementioned disadvantages of the prior art.

An additional object of the present invention is to provide an optical recording medium which permits use of an optical head device for an optical disk apparatus having a relatively high numerical aperture and which provides for a recordable storage capacity of 8 GB or more.

According to an aspect of the present invention, an optical recording medium of the present invention includes a base formed of thermoplastic resin having a thickness ranging from between approximately 0.3 to 1.2 mm, a guide groove formed on the base, a recording area formed of at least a reflective film and a phase-change recording layer on the guide groove, and a light transmissive layer having a thickness of between approximately 3 to 177 $\mu$m formed on at least the recording area. In this optical recording medium, the unevenness $\Delta t$ of the thickness of the light transmissive layer is set within the range of:

$$\Delta t \leq \pm 5.26(\lambda/N.A.^4)(\mu m)$$

wherein N.A. represents a numerical aperture of the optical head device of the optical disk recording and/or reproducing apparatus and $\lambda$ represents the wavelength of laser light utilized by the optical disk recording and/or reproducing apparatus.

Accordingly, an optical recording medium has been provided which achieves a storage capacity of at least 8 GB of more with excellent signal characteristics.

BRIEF DESCRIPTION OF THE DRAWINGS

The following detailed description, given by way of example, will best be understood in conjunction with the accompanying drawings in which:

FIGS. 24A to 24E are diagrams illustrating manufacturing processes for the optical recording medium according to the present invention.

DETAILED DESCRIPTION OF CERTAIN PREFERRED EMBODIMENTS

Figure 1:
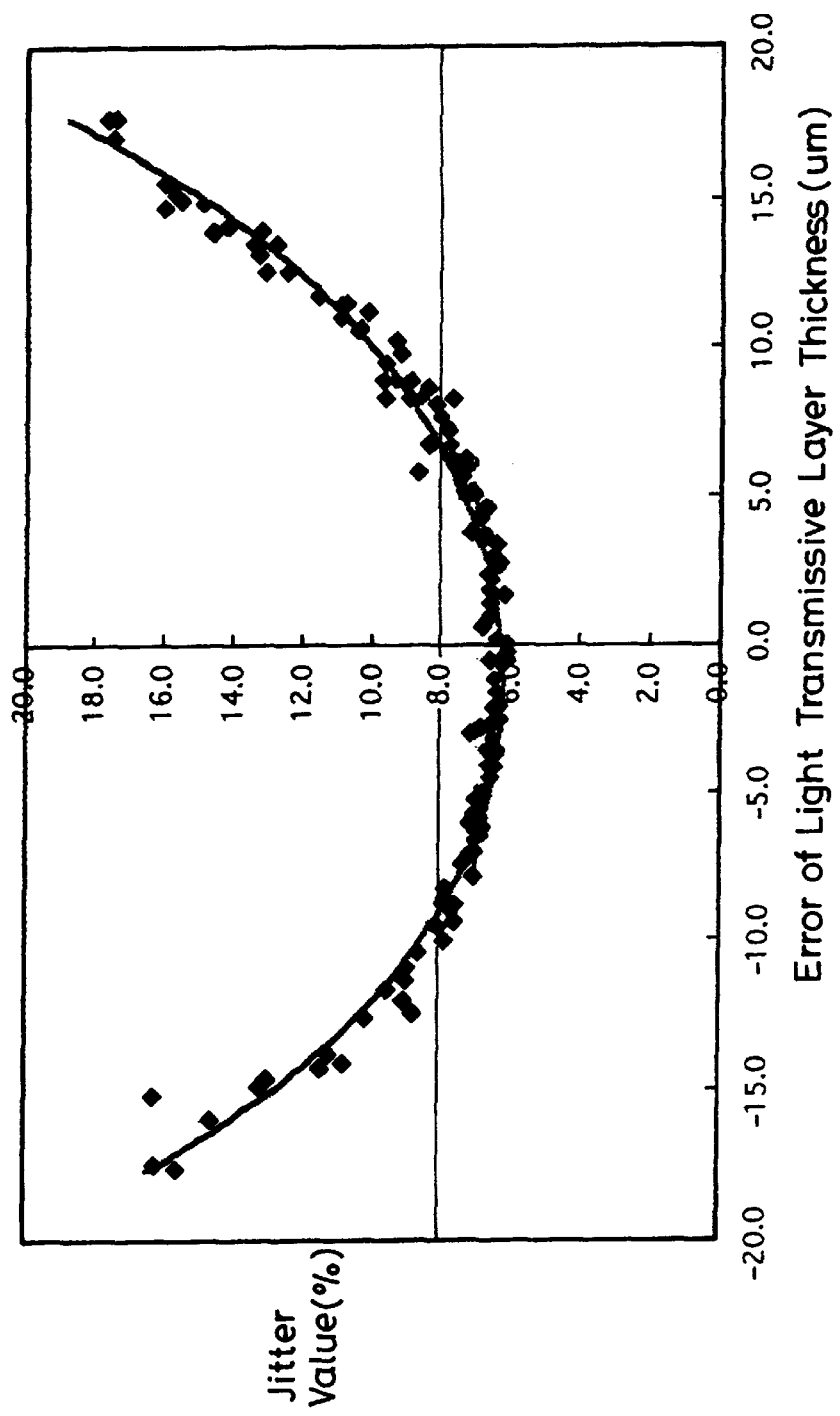
FIG. 1 is a graph plotting experimental data concerning percentage change of jitter value relative to error of the disk (transmissive layer or cover) thickness.

An optical disk according to an embodiment of the present invention will hereinafter be described in detail with reference to the accompanying drawings wherein like reference numerals are used throughout.

More particularly, the present invention relates to an optical disk which has a guide groove formed on a base, e.g., a substrate, and an information recording layer formed of at least a reflective film and a phase-change recording layer on the guide groove where a signal is recorded and reproduced by irradiating laser light on a light transmissive layer provided on the information recording layer. The optical recording medium according to the present invention is not limited to the optical recording medium having the above structure and can be applied to card-shaped optical recording disk, a sheet-shaped optical recording disk and optical recording disks having other various shapes.

In general, the disk skew (bend or warp) margin $\theta$, the numerical aperture (N.A.) of the optical head device of the optical disk apparatus, and the thickness t of a light transmissive layer are related to one another in an optical recording disk. Japanese Patent Publication No. H3-225650 discloses the relationship between these parameters and the skew margin $\theta$ with reference to a compact disk (CD) with proven operating characteristics.

According to Japanese Patent Publication No. H3-225650, the correlation between $\theta$, N.A. and t has been established for a compact disc (CD) by the (2) following equation (2):

$$\theta \leq \pm 84.115(\lambda/\text{N.A.}^3/t) \qquad (2)$$

This relationship can be applied as well to the optical recording medium according to the present invention.

A specific limit value of the skew (bend or warp) margin $\theta$ required when an optical disk is mass-produced is properly set at approximately 0.4°. This limit is set due to mass production requirements of the optical disk, as if the limit value is set smaller than that set forth above, the manufactured yield of the optical disks is lowered, and consequently, manufacturing costs thereof are increased. In existing recording media, the limit value of the skew margin $\theta$ of the CD is 0.6° and that of the DVD is 0.4°.

Accordingly, the thickness of the light transmissive layer is calculated assuming that the wavelength of laser light of the optical disk apparatus is set shorter and a value of the numerical aperture N.A. of the optical head device of the optical disk apparatus is set larger under the condition of the skew margin $\theta$=0.4°. For instance, if $\lambda$ is 0.65 $\mu$m, then the value of N.A. must be 0.78 or more (which results from equation (1) above).

If the wavelength of laser light becomes increasingly shorter and then $\lambda$ is set at 0.4 $\mu$m, then the thickness t of the light transmissive layer is set at 177 $\mu$m. Therefore, if existing compact dick manufacturing equipment is utilized for manufacturing of an optical disk having a substrate with a thickness of 1.2 mm, then the maximum thickness of the entire optical disk is about 1.38 mm.

A lower limit of the thickness t of the light transmissive layer is determined depending upon whether the light transmissive layer also protects a recording film or a reflective film layer. Specifically, the minimum thickness of the light transmissive layer must be about 3 $\mu$m or more to obtain sufficient rigidity of the optical recording medium and to resist scratching or damage which may occur due to collisions of a two-element lens arrangement hereinafter described onto the surface of the light transmissive layer.

As aforementioned, an increase of the value of N.A./λ is required for increasing the storage capacity of the optical recording medium. In this case, in order to achieve a storage capacity of at least 8 GB, the value of N.A. must be set to at least 0.7 or more and the wavelength λ of the laser light must be set to 0.68 μm or less.

While the above relationship between the thickness of the light transmissive layer and the skew must be considered, the thickness t of the light transmissive layer is properly set within the range from about 3 to 177 μm in order to allow use of a laser ranging from an existing red laser to a blue laser which is expected to be utilized more prevalently in the future.

In addition, the track pitch P and the linear density d must be changed to achieve a recording capacity of at least 8 GB. A necessary condition therefore is to satisfy the following equation (3):

$$(0.74/P) \times (0.267/d) \times 4.7 \geq 8 \quad d \leq 0.1161/P (\mu m/bit) \qquad (3)$$

Therefore, when P=0.56 μm, d≦0.207 μm/bit.

This example is calculated with reference to the values for a DVD-ROM (read-only memory). Accordingly, in consideration of advances in signal processing for recording and reproduction (i.e., application of partial response maximum likelihood (PRML), decrease of redundancy of the ECC, etc.), it is expected that the linear density will be increased by 15%, and hence, the track pitch P can be increased as well to that extent. Accordingly, it has been found that the maximum track pitch P is set at 0.64 μm.

Moreover, a tolerance for fluctuation ΔP of the track pitch is set precisely. If the optical disk has the same recording and reproduction parameters of the CD or the DVD, then the following equation (4) is obtained for a track pitch of 0.74 μm and a tolerance of ±0.03 μm employed in the DVD.

$$\Delta P \leq \pm 0.03 P / 0.74 = \pm 0.04 P \qquad (4)$$

Accordingly, if P=0.56, then ΔP≦±0.023 μm.

Moreover, unevenness of the thickness of the light transmissive layer must be improved more accurately. If the thickness of the light transmissive layer is changed from an average value based upon the design of a reproduction objective lens, the amount of aberration resulting from influence of the uneven thickness on a specific location (laser spot) is in proportion to a biquadrate of the value of the numerical aperture (N.A.) and the wavelength λ.

Accordingly, if it is desired to increase the recording density by increasing the value of the numerical aperture and shortening the wavelength, then the unevenness of the thickness of the light transmissive layer is reduced even more.

An example of a compact disc in current use has a numerical aperture of 0.45 and a standard tolerance for the uneven thickness of the light transmissive layer of ±100 μm. In comparison, the DVD has a numerical aperture of 0.6 and a standard tolerance of the uneven thickness of the light transmissive layer of ±30 μm.

If the allowance amount of ±100 μm for the uneven thickness of the light transmissive layer in the compact disc is employed as a reference, then the unevenness Δt of the thickness of the light transmissive layer is expressed by the following equation (5).

$$\Delta t = \pm (0.45 / N.A.)^4 \times (\lambda / 0.78) \times 100 \qquad (5)$$

$$= \pm 5.26 \times (\lambda / N.A.^4) \, \mu m$$

(wherein N.A. represents a numerical aperture of an optical head device of the optical recording and/or reproducing apparatus).

FIG. 1 shows experimental results of the relationship between the unevenness of the thickness of the light transmissive layer and a jitter value obtained when the average thickness of the light transmissive layer is 100 μm and when the wavelength is 0.68 μm and the numerical aperture is 0.875.

FIG. 1 demonstrates that when the jitter value is 8% (which is a jitter reference obtained when no fluctuation or deviation occurs due to a skew or the like), the unevenness of the thickness of the light transmissive layer is about ±7 μm. Since the value obtained from equation (5) is ±6 μm, a satisfactory signal can be obtained utilizing a disk medium satisfying this standard.

Therefore, the allowance for the unevenness Δt of the thickness of the light transmissive layer must be set within the range of ±5.26×(λ/N.A.$^4$).

Since for purposes of these calculations, it is assumed the light transmissive layer is uniform wherein the optical disk surface is irradiated with a recording and reproduction laser, any aberration thereof can be corrected by displacing the focus point of the laser. However, if the thickness of the light transmissive layer is uneven in this irradiation area (i.e., in the particular spot location irradiated), correction of any aberration by adjusting the focus point is impossible. In order to correct any aberration by adjusting the focus point, this unevenness Δt must be reduced to ±3λ/100 or less with respect to an average of the thickness.

Moreover, although the eccentricity E of the DVD is 50 μm, the eccentricity E of any optical recording disk may be determines, by the following equation (6):

$$E \leq 50 \times P / 0.74 = 67.57 P (\mu m) \qquad (6)$$

Based upon the foregoing, the conditions required for an optical recording medium to achieve a high density allowing a storage capacity of at least 8 GB now follows.

An optical disc recording and reproducing apparatus is utilized wherein λ≦0.68 μm and N.A./λ≦1.20. The optical recording medium has a light transmissive layer having a thickness t between approximately 3 to 177 μm and a thickness unevenness Δt≦±5.26 (λ/N.A.$^4$) (μm). The optical recording medium also has a track pitch P≦0.64 μm, a tolerance ΔP≦±0.04P, a linear density d≦0.1161/P (μm/bit), a disc skew (bend) θ≦84.115×(λ/N.A.$^3$/t), an eccentricity E≦67.75P (μm), and a surface roughness Ra≦±3 λ/100 (in the spot irradiation area).

A base, e.g., a substrate, of the optical recording medium is formed by an injection molding process which employs a stamper which achieves a pitch and pitch fluctuation along the surface thereof which satisfies the above-mentioned specifications required for the optical recording medium according to the present invention.

Since it is difficult to manufacture such a high-accuracy stamper requiring reduced pitch fluctuation by conventional machines performing a screw feeding operation, the required stamper is manufactured by an original disk exposing device having a linear motor feeder.

Moreover, the optical system of the disk recording and reproducing apparatus is covered with a cover for eliminating movement of air, and has a vibroisolating material provided between the laser and an exposing device for removing vibration of cooling water for an exposure laser.

Figure 2:
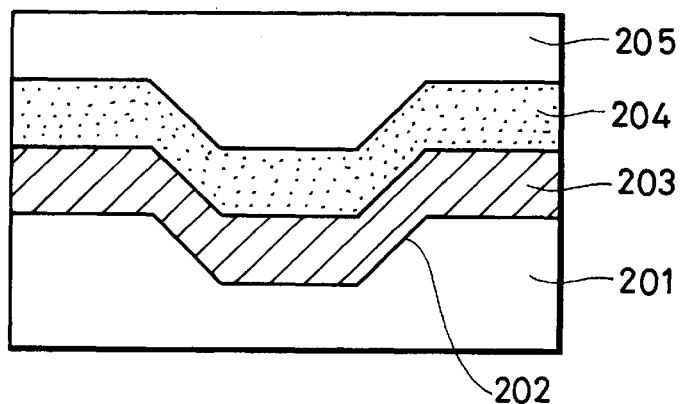
FIG. 2 is a schematic, cross-sectional view illustrating a preferred embodiment of the respective layers of an optical disk according to the teachings of the present invention.

In this embodiment, as shown in FIG. 2, a guide groove 202 is formed on the base 201 (i.e., the substrate), and a reflective film 203, a phase-change recording layer 204 and a light transmissive layer 205 are formed on the guide groove 202.

In this optical recording medium, in order to obtain a designated groove width at the phase-change recording layer, the guide groove structure (and the address pits) on the surface of the substrate 201 are formed considering the effect of at least the reflective film 203 being positioned between the phase-change recording layer 204 and the surface of the substrate 201.

For example, if asymmetry of a signal pit of a signal pit series of a ROM type optical recording medium having a storage capacity of 10 GB is 25%, when the signal pit is reproduced from the side of the substrate 201 (base), then the asymmetry of the signal pit reproduced from the side opposite to the side of the substrate side is 10%. Specifically, since the signal is read out from the side of the light transmissive layer 205 which is the side opposite to the side of the substrate, the asymmetry of the pit must be 25% when the substrate is formed, in order to form a pit having the asymmetry of 10% when the pit is viewed from the side of light irradiation.

Figure 3:
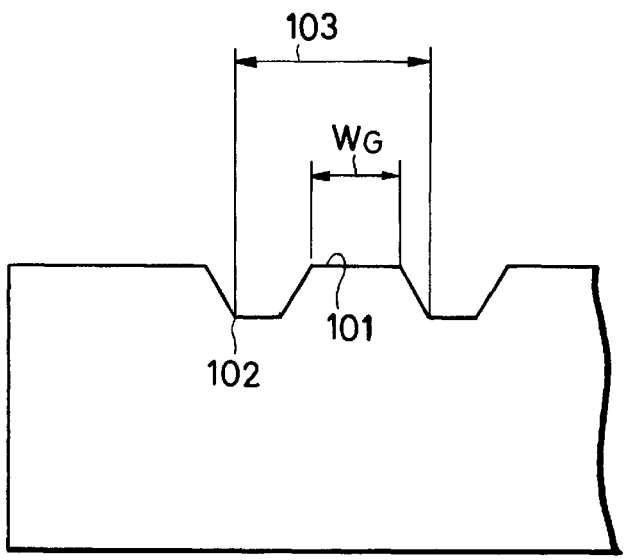
FIG. 3 is a diagram illustrating a guide groove structure of the base of the optical disk of FIG. 2 specifically illustrating a groove, land and a groove width.

As shown in FIG. 3, a guide groove structure for an optical disk of the present invention is illustrated wherein a portion of the guide groove structure is irradiated with laser light during the mastering thereof. By definition and for purposes of the explanation herein, the portion of the guide groove structure of the substrate closest to the light source is referred to as the groove and the portion of the guide groove structure of the substrate farthest from the light source is referred to as the land. Therefore, the guide groove structure of FIG. 3 includes a convex portion on the light transmissive layer side which is referred to as a land 102. A portion of the guide groove structure formed as a concave portion with reference to the light transmissive layer side in FIG. 3 is referred to as a groove 101. A width of a flat portion obtained by excluding a tapered portion from a groove portion is referred to as a groove width WG. A sum of the widths of a land 102 and a groove 101 adjacent thereto is referred to as the track pitch 103.

Figure 4:
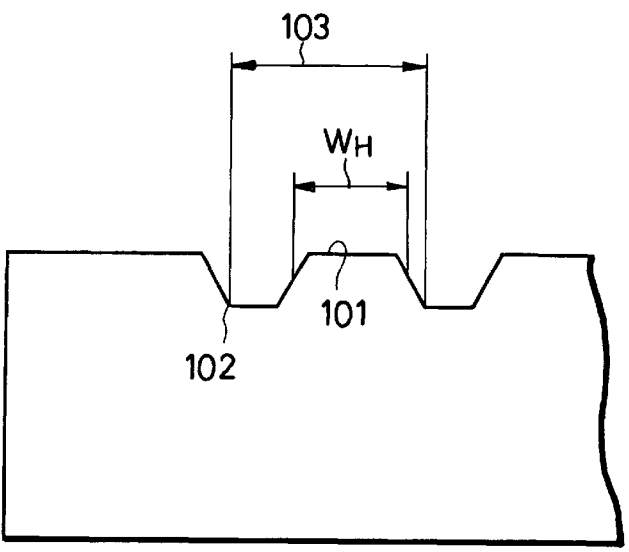
FIG. 4 is a diagram illustrating a guide groove structure formed on a base of the optical disk of FIG. 2 used for defining the groove duty ratio.

As shown in FIG. 4, the width between adjacent mid-level positions of the respective tapered portions of the groove 101 is referred to as a half-width WH, and a value of (the half width WH of a groove/track pitch 103)×100% is referred to as a groove duty ratio.

Similar to the asymmetry of the above-mentioned optical ROM disk, a groove duty ratio with respect to the guide groove at the phase-change recording layer is different from its original value on the surface of the substrate (because at least a reflective layer is deposited on the substrate prior to deposition of the phase-change recording layer). Specifically, if a ratio of a concave-portion (groove) width to a convex portion (land) width thereof at the phase-change recording layer as viewed from the side of the light transmissive layer is set to a desired ratio, the stamper must be manufactured to account for such changes in the groove duty ratio.

In addition, the land narrows gradually as the reflective layer and the phase-change recording layer are deposited, and hence the convex portion of the stamper which forms the concave portion on the substrate or the land, must be formed wider than a target land width at the phase change recording layer to an extent determined experimentally.

The optical crosstalk between signals on consecutive lands and grooves is minimized when the level difference of the land and the groove is $\lambda(1\pm 2m)/8$ (where m is 0 or a natural number). As the level difference of land and the groove increases, influence of the cross erasure or the thermal crosstalk between consecutive lands and grooves decreases. Accordingly, in consideration of the stamper for forming a substrate, establishment of $\lambda/8$ or $3\lambda/8$ is practical in order to satisfy these characteristics.

If signals are recorded on both the land and groove by the phase-change method, in order to obtain land and groove duty ratios of at least 50% at the phase-change recording film, the duty ratios of the land (concave portion) on the substrate must be substantially within the range of between approximately 58 to 65% or within the range of between approximately 65 to 75% depending upon the land height depth, measured from the light transmissive layer side, of $\lambda/8$ or $3\lambda/8$.

Figure 5:
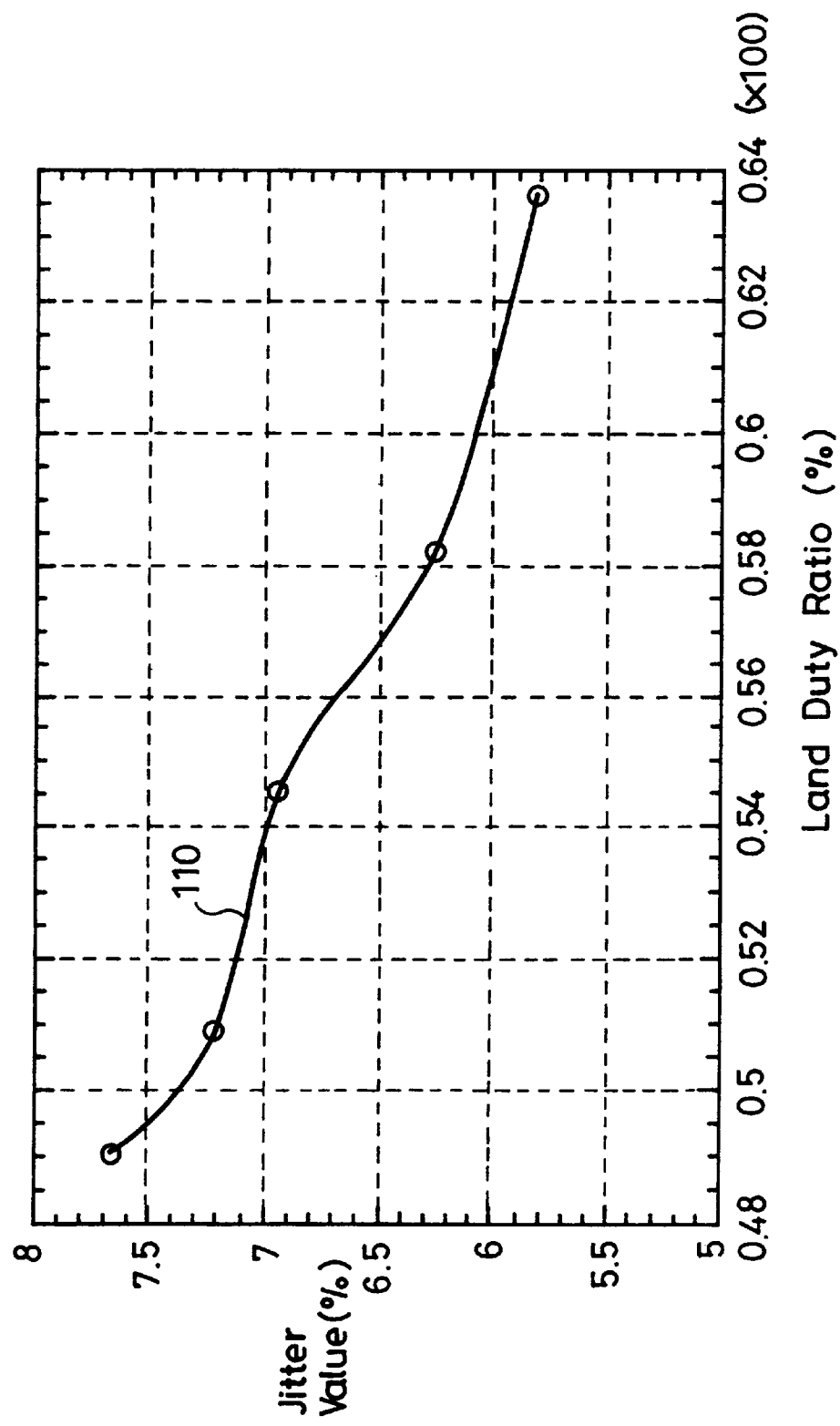
FIG. 5 is a graph illustrating the relationship between land duty ratio and percentage of jitter value.

FIG. 5 is a graph illustrating a signal characteristic curve obtained when the present invention is applied to a phase-change recording disk. The curve 110 in FIG. 5 represents measurement results of the relationship between a land duty ratio (%) and a jitter value (%) obtained when a signal is recorded on the land. As is shown in FIG. 5, if the land duty ratio is 58%, then the jitter value can be set smaller. If, on the other hand, the land duty ratio exceeds 65%, interference (optical crosstalk) between recorded signals on adjacent tracks is increased, and thus, signal quality is lowered. Therefore, it is desirable to set the land duty ratio within the range of between approximately 58 to 65%.

Figure 6:
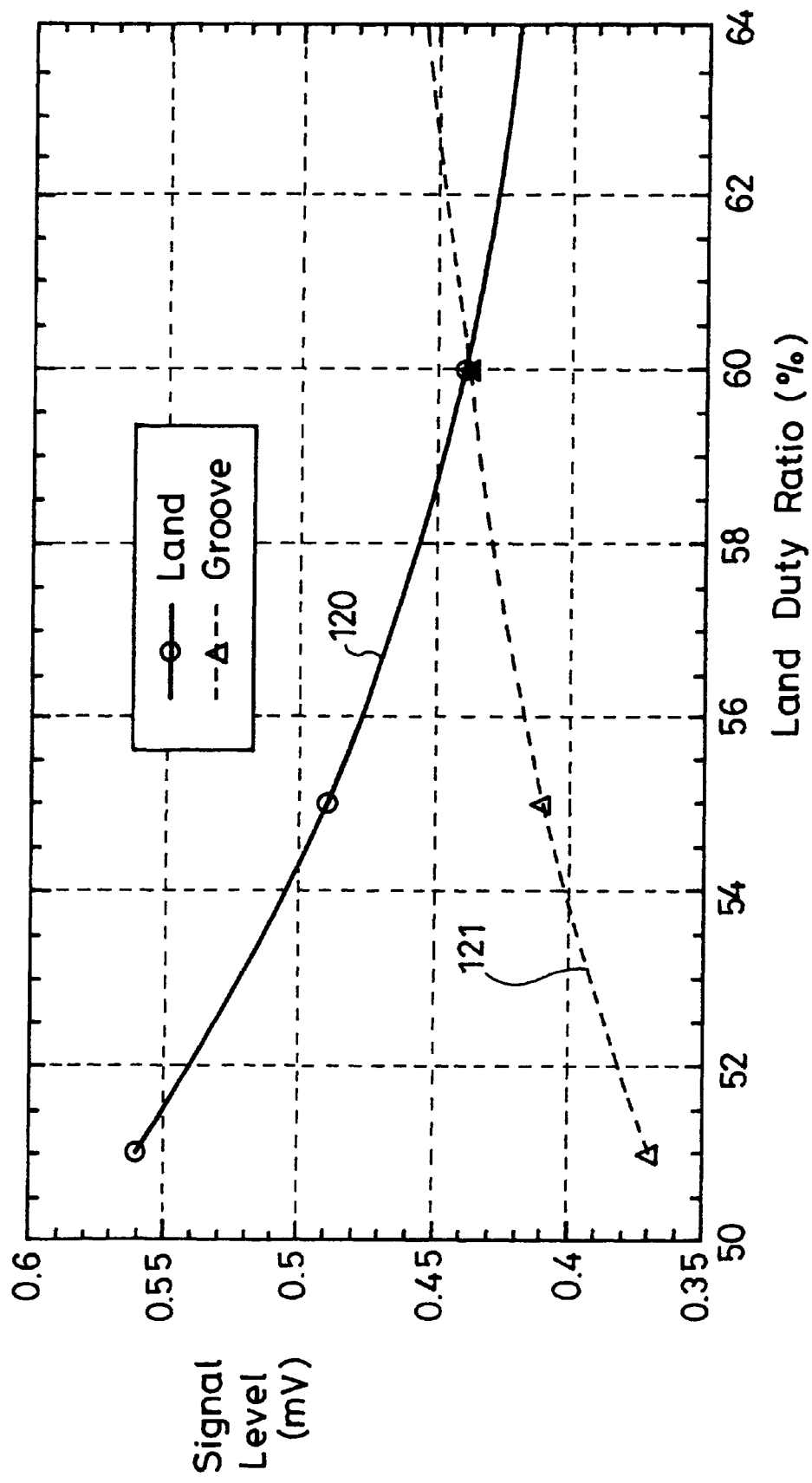
FIG. 6 is a graph illustrating the relationship between duty ratio for the groove and the land and signal level (mv).

FIG. 6 is a graph showing the relationship between a land duty ratio and a signal level (mv) obtained when the optical recording medium of the present invention is applied to a phase-change recording disk where a signal is recorded on both the land and the groove.

As is shown in FIG. 6, curves 120 and 121 represent measurement results of respective relationships between the land duty ratio (%) and signal levels of signals recorded on the land and the groove. FIG. 6 demonstrates that if the level difference or land height, etc. is $1/8\lambda$, the signal levels of the signals recorded on the land and the groove coincide with each other when the land duty ratio is about 60%.

Moreover, based upon the results reflected in FIG. 6, when the land duty ratio is within the range of between approximately 58 to 65%, the signal levels of the signals recorded on the land and the groove are substantially balanced with each other thereby providing an acceptable condition.

Figure 7:
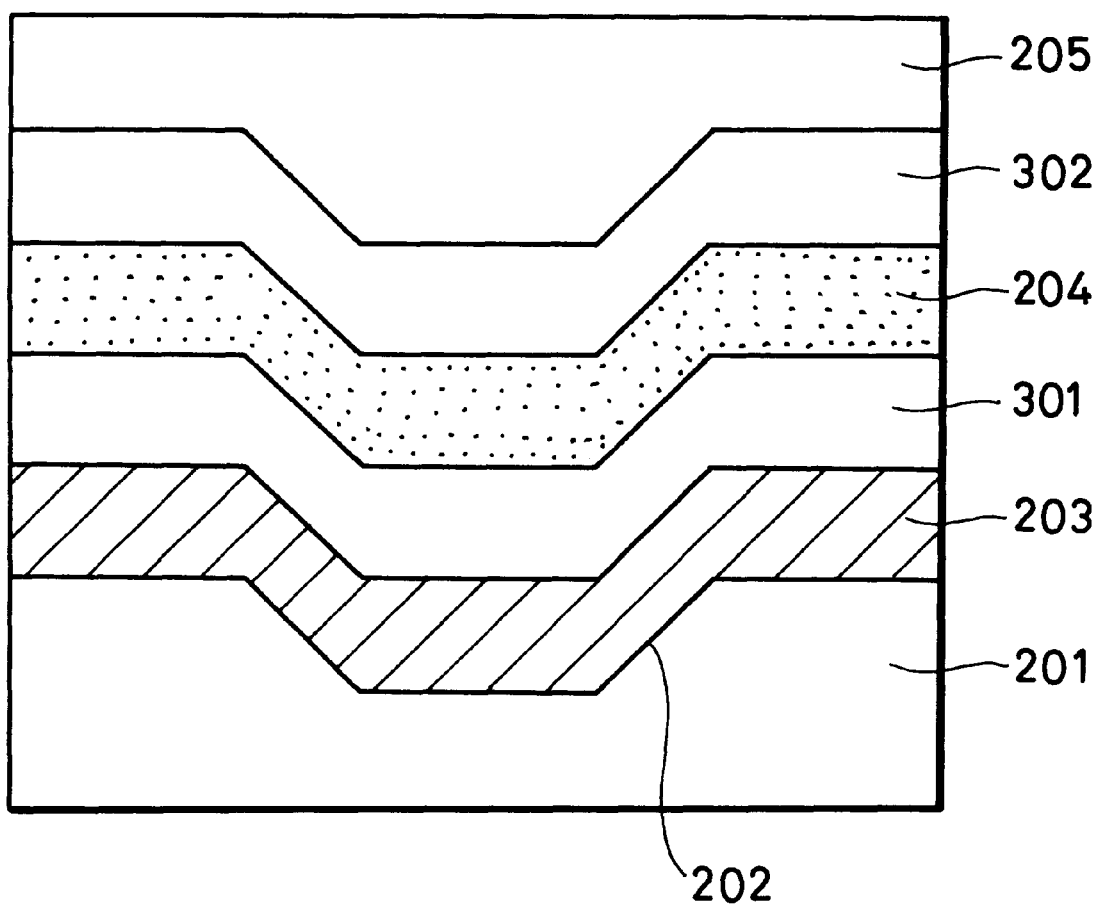
FIG. 7 is a schematic, cross-sectional view illustrating the respective layers of another preferred embodiment of an optical disk in accordance with the teachings of the present invention.

Since information is read out from or recorded on the optical disk according to the present invention from the side of the light transmissive layer which is formed on the side opposite to the base (i.e., the substrate), the optical disk according to each of the following embodiments of the present invention described hereinafter has, as is shown in FIG. 7, a reflective film 203, a first dielectric layer 301, a phase-change recording film 204, a second dielectric layer 302, and a light transmissive layer 205 successively deposited on a guide groove 202 formed on a substrate 201.

As is shown in FIG. 7, each of the layers and films of this optical disk is formed as follows. The reflective film 203 is formed by ion beam sputtering of Al or Al alloy and has a thickness of between approximately 50 to 200 nm. The first dielectric layer 301 is formed by using a mixture of ZnS and $SiO_2$, for example, and has a thickness of approximately 30 nm. The phase-change recording film 204 is formed by using GeSbTe, for example, and has a thickness of between approximately 10 to 30 nm. The second dielectric layer 302 is formed by using a mixture of ZnS and $SiO_2$ and has a thickness of approximately 50 to 200 nm.

The reflective film 203 can also be formed by using Au. In this case, the reflective film 203 is formed by direct-current (DC) sputtering so as to have a thickness of between approximately 50 to 120 nm.

A mixture of a nitride, an oxide, and a sulfide of metal, such as Al, Si or the like, and of a semi-metal element can be utilized for the first and second dielectric layers 301 and 302. For example, AlN, $Si_3N_4$, $SiO_2$, $Al_2O_3$, ZnS and $MgF_2$, etc. can be utilized, as long as they do not absorb light in a region of a wavelength of a semiconductor laser light.

Since a conventional phase-change optical disk has only a dielectric layer having a maximum thickness of 100 nm which is formed between a phase-change recording film and a guide groove on a substrate, the guide groove structure remains clear even after the phase-change recording layer is deposited.

However, since the optical disk according to the present invention includes a reflective film layer 203 having thickness of about 200 nm and the first dielectric layer 301 is formed between the phase-change recording film 204 and the guide groove 202 formed on the substrate 201, the total thickness of the reflective film 203 and the first dielectric layer 301 present difficulties in reflecting the shape of the guide groove 202 on the substrate 201 in the phase-change recording film.

In particular, the properties of the surface of the substrate 201 can present harmful effects in the crystallinity of the reflective film 203 and the shape of an interface formed of crystal domains whose domain size depends upon composition of the reflective film 203. These harmful effects of the substrate surface properties may in turn promote or influence further harmful effects with respect to the properties of the phase-change recording film 204.

Therefore, the reflective film 203 forming the optical disk according to the present invention is formed by ion beam sputtering of Al so as to have a thickness of between approximately 50 to 200 nm or formed by DC sputtering of Au, or an Al alloy containing Ti of between about 0.5 weight % to 10 weight %, more preferably of between 3.0 weight % to 10 weight %, or an Al alloy containing Ti of between 0.5 weight % to 10 weight %. This processing allows the optical disk to achieve superior signal characteristics.

Figure 8:
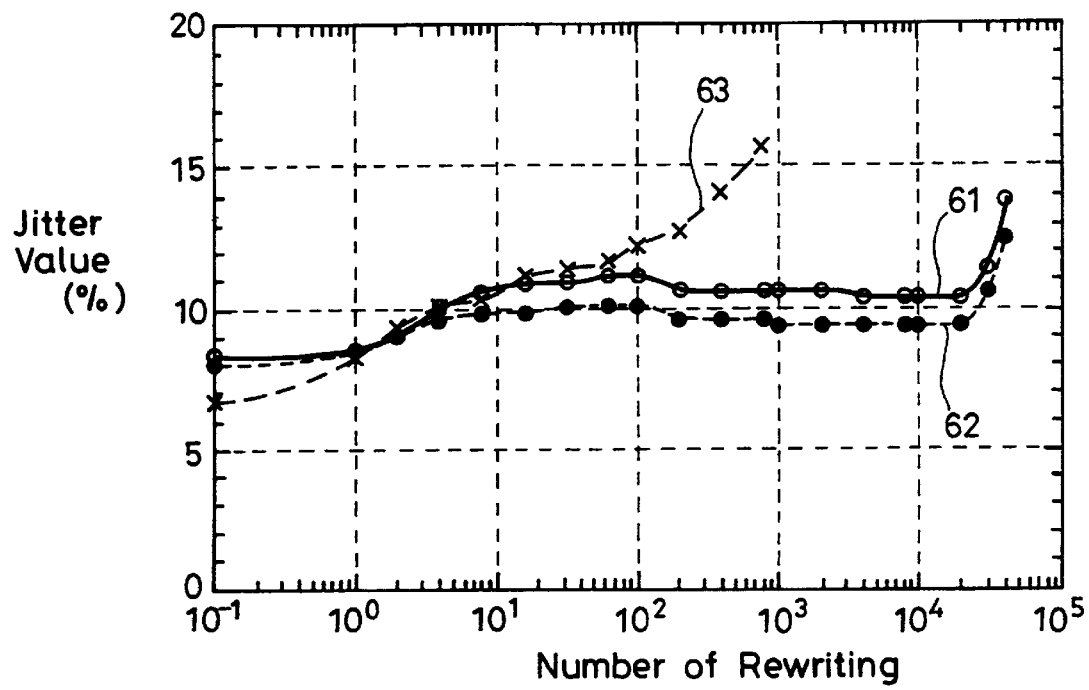
FIG. 8 is a graph illustrating the relationship between the number of rewriting operations and percentage of jitter value for the optical disk of FIG. 7 wherein the reflective film is formed by ion beam sputtering of Al and is 100 mm thick, is formed by ion beam sputtering of Al and is 150 mm thick, and is formed by DC sputtering of Al of 150 mm thick.

FIG. 8 illustrates measurement results of the relationship between the number of signal rewrites and a jitter value obtained when an Al reflective film is formed by ion beam sputtering and DC sputtering. In FIG. 8, curve 61 represents measurement results of the number of signal rewrites and a jitter value obtained when a reflective film is formed by ion beam sputtering of Al so as to have a thickness of 100 nm, curve 62 represents the measurement results of the number of signal rewrites and the jitter value obtained when the reflective film is formed by ion beam sputtering of Al so as to have a thickness of 150 nm, and curve 63 represents the measurement results of the number of signal rewrites and the jitter value obtained when the reflective film is formed by DC sputtering of Al so as to have a thickness of 150 nm.

As shown in FIG. 8, when the reflective film is formed by ion beam sputtering, until an optical disk is rewritten about ten thousand times, the overwrite jitter value of the phase-change signal remains below 15%. Specifically, the quality of an optical disk cannot be reasonably assured until the optical/disk is rewritten about ten thousand times, and if the reflective film of the phase-change layer is formed of Al, use of the ion beam sputtering can result in an optical disk with excellent signal characteristics as compared with use of DC sputtering.

Figure 9:
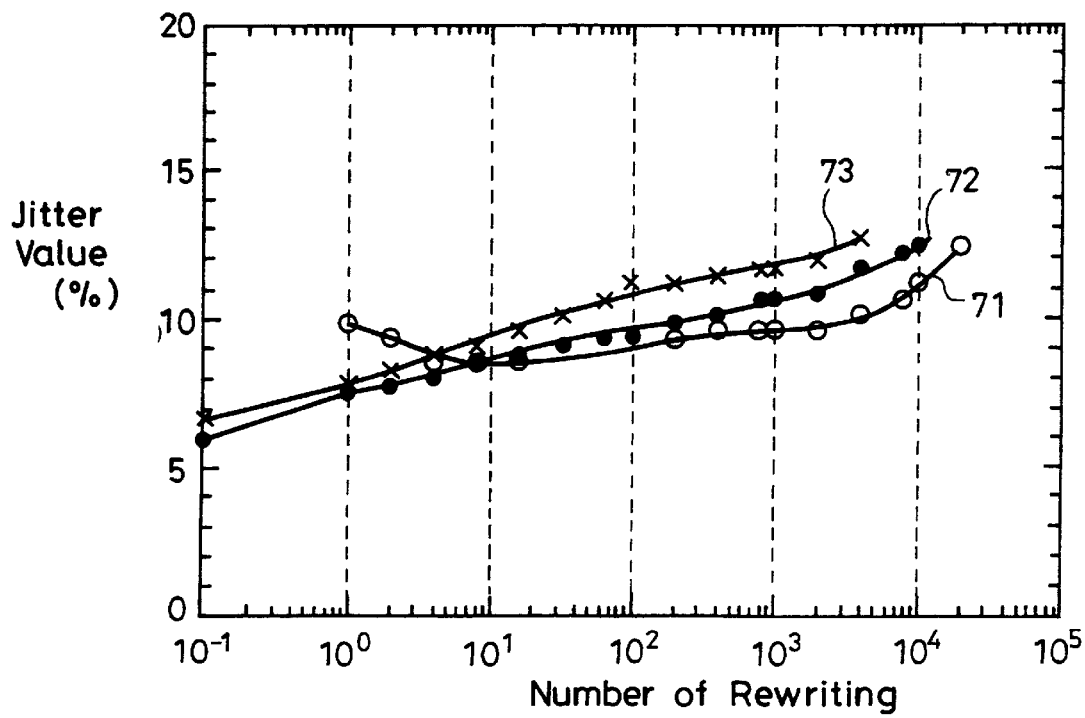
FIG. 9 is a graph illustrating the relationship between the number of rewriting operations and percentage of jitter value for the optical disk of FIG. 7 wherein the reflective film is formed by DC sputtering of Au and is 60 mm thick, is formed by DC sputtering of Au and is 90 mm thick, and is formed by DC sputtering of Au and is 120 mm thick.

FIG. 9 illustrates measurement results of the number of signal rewrites and a jitter value obtained when a reflective film is formed by DC sputtering of Au. As is shown in FIG. 9, curves 71, 72 and 73 represent the measurement results of the number of signal rewrites and the jitter value obtained when the reflective films are formed by DC sputtering of Au so as to have thicknesses of 60 nm, 90 nm and 120 nm. FIG. 9 demonstrates that when the reflective film is formed of Au, until a phase-change disk is rewritten about ten thousand times, an overwrite jitter value of the phase-change signals remains below 15%. Comparison of the results shown by the curves 71, 72, 73 in FIG. 9 with the results shown by the curve 63 in FIG. 8 evidences that Au is more suitable for use for the reflective film than is Al when the reflective film is formed by DC sputtering.

Figure 10:
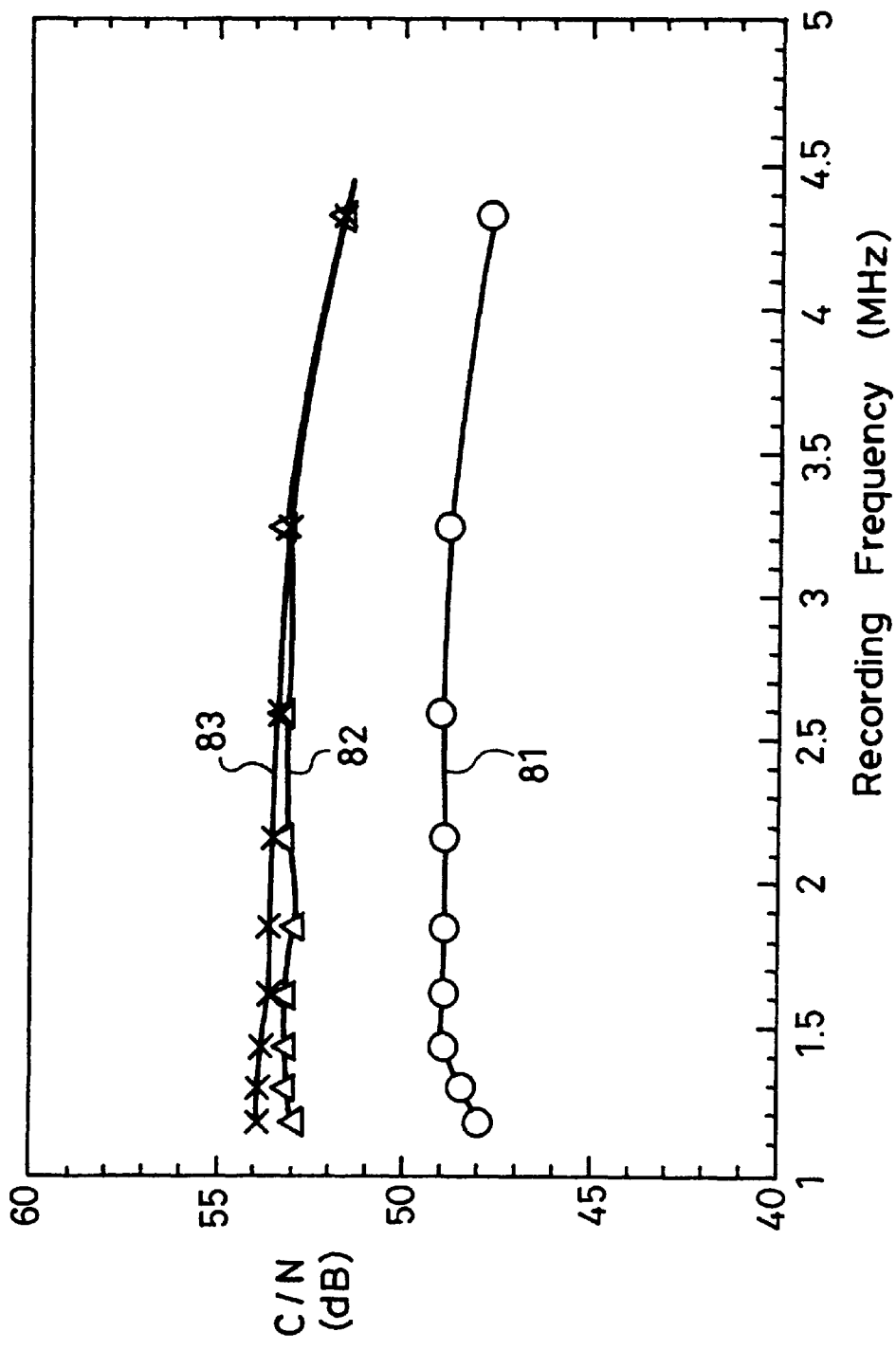
FIG. 10 is a graph illustrating the relationship between recording frequency (MHz) and carrier-to-noise ratio (C/N) for the optical disk of FIG. 7 having a reflective film formed of Al by DC sputtering, Al—Ti by DC sputtering, and Al by ion beam sputtering.

FIG. 10 illustrates the relationship between recording frequencies (MHz) and carrier-to-noise ratios (C/N) obtained when a reflective film is formed by DC sputtering of Al (as represented by curve 81), by DC sputtering of an Al alloy containing Ti of 0.5 to 10 weight % (as represented by curve 82), and by ion beam sputtering of Al (as represented by a curve 83). In comparing curve 81 with curve 83 in FIG. 10, the carrier-to-noise ratio (C/IN) obtained when the reflective film is formed by ion beam sputtering is improved as compared with that obtained when a reflective film is formed by DC sputtering. In addition, forming the reflective film by ion beam sputtering can achieve acceptable results. Moreover, comparison of the curve 81 with the curve 82 in FIG. 10 shows that the carrier-to-noise ratio (C/N) obtained when the reflective film is formed by DC sputtering of an alloy of Al and Ti present superior results as compared with that obtained when a reflective film is formed by DC sputtering of only Al. Furthermore, comparison of the curve 82 with the curve 83 in FIG. 10 shows that a carrier-to-noise ratio (C/N) obtained when the reflective film is formed by DC sputtering of an Al alloy containing Ti of about 0.5 to 10 weight % can present similar superior results to that obtained when a reflective film is formed by ion beam sputtering of Al. Even if the Al alloy containing Cr of approximately 0.5 to 10 weight % is utilized instead of Ti for forming the reflective film, acceptable results are obtained similar to those obtained when a reflective film is formed of an alloy of Al and Ti.

Figure 11:
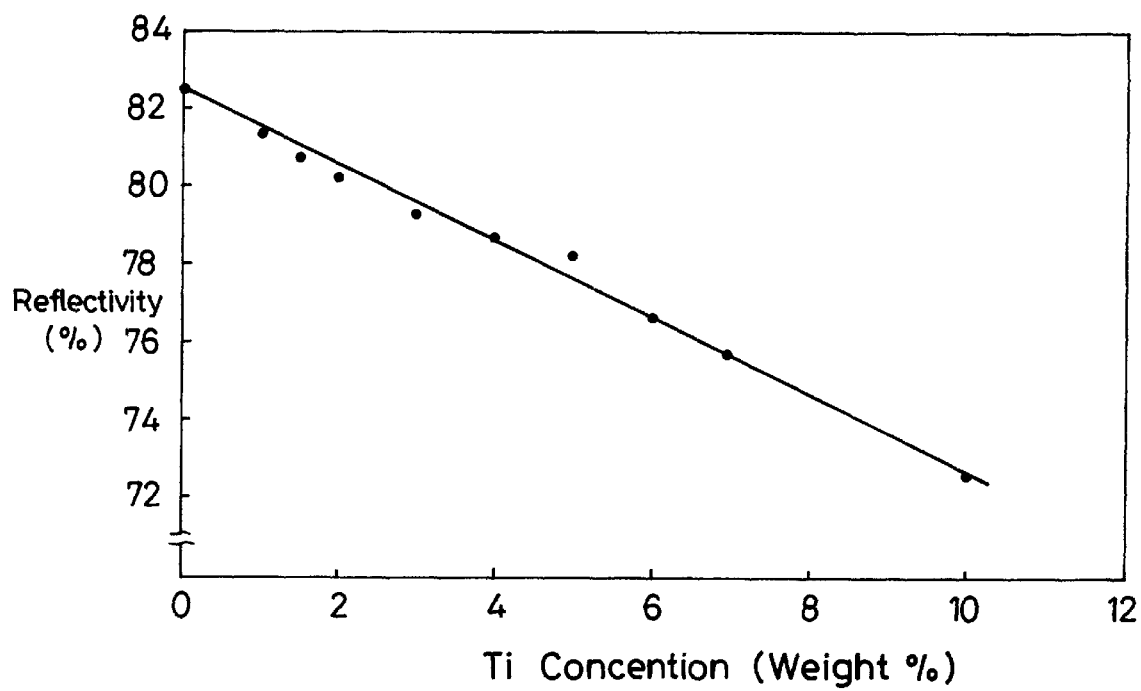
FIG. 11 is a graph illustrating the relationship between Ti concentration (weight %) in Al alloy and reflectivity for the reflective film of the optical disk of FIG. 7.

FIG. 11 illustrates a relationship between Ti concentration (weight %) of the above Al alloy and the reflectivity of a reflective film formed with this Al alloy. FIG. 11 illustrates that if the Ti concentration (weight %) of Al alloy exceeds 10% by weight, then the reflectivity of the reflective film is reduced (72% or less), which prevents a sufficient signal from being obtained. Therefore, the Ti concentration (weight %) of the Al alloy must be set within the range of between approximately 0.5 to 10% by weight.

The process for manufacturing the phase-change optical disk of FIG. 7 will now be described. A polycarbonate substrate having a thickness of 1.2 mm is subjected to mastering so as to obtain a stamped substrate 201 having a track pitch of 0.55 $\mu$m, a land width of 0.35 $\mu$m and a land depth of about 53 nm. A reflective film 203 to be described in more detail later was formed on the polycarbonate substrate 201. A first dielectric layer 301 having a thickness of 18 nm and formed of a mixture of ZnS and $SiO_2$ was formed on the reflective film 203. A GeSbTe alloy with a thickness of 24 nm was deposited as the phase-change recording film 204 on the first dielectric layer 301. A second dielectric layer 302 having a thickness of 100 nm and formed of a mixture of ZnS and $SiO_2$ was formed on the phase-change recording film 204. A polycarbonate light transmissive layer 205 having a thickness of 100 $\mu$m was formed on the second dielectric layer 302.

Figure 12:
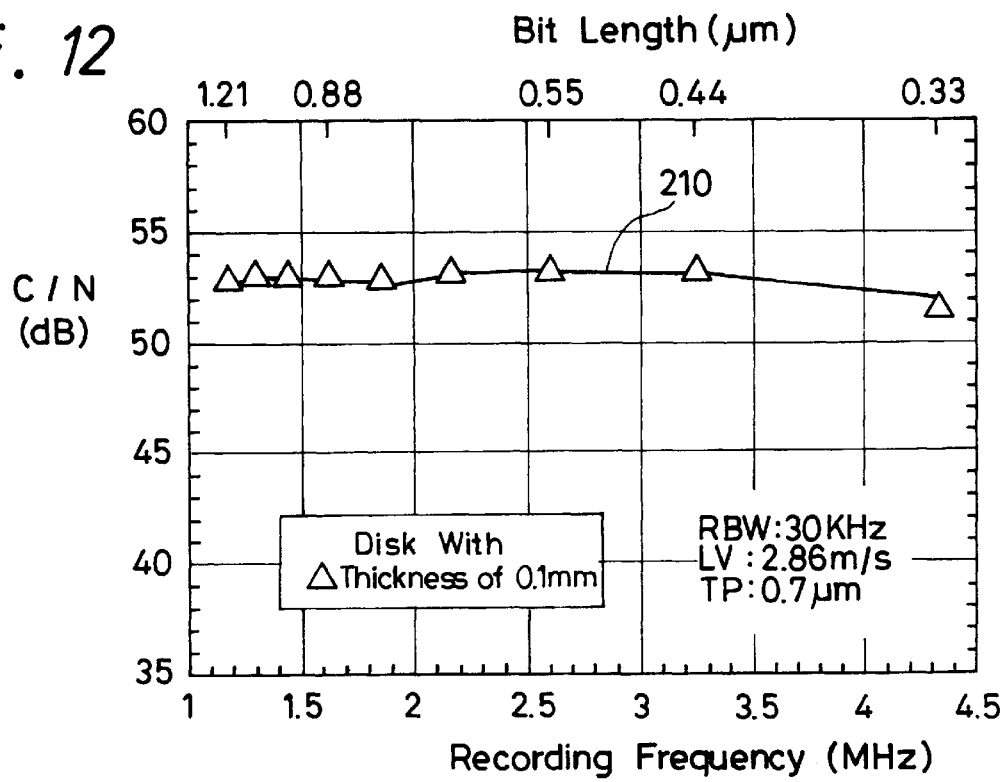
FIG. 12 is a graph illustrating the relationship between recording frequency (MHz) and carrier-to-noise ratio (C/N) of an optical disk.

The reflective film 203 of the above optical disk is formed by ion beam sputtering of Al so as to have a thickness of 60 nm. An information signal was recorded on a land with a bit length being varied under the condition of a recording laser power of 6 mV, an erasure laser power of 2.7 mW and a readout laser power of 0.5 mW and a linear velocity of 2.86 m/s, and thereafter the recorded information signal was reproduced. Curve 210 of FIG. 12 shows the relationship between the recording frequency (MHz) and the carrier-tonoise ratio (C/N) obtained on the resulting optical disk. FIG. 12 evidences that when the reflective film is formed by ion beam sputtering of Al, acceptable signal characteristics can be obtained.

Figure 13:
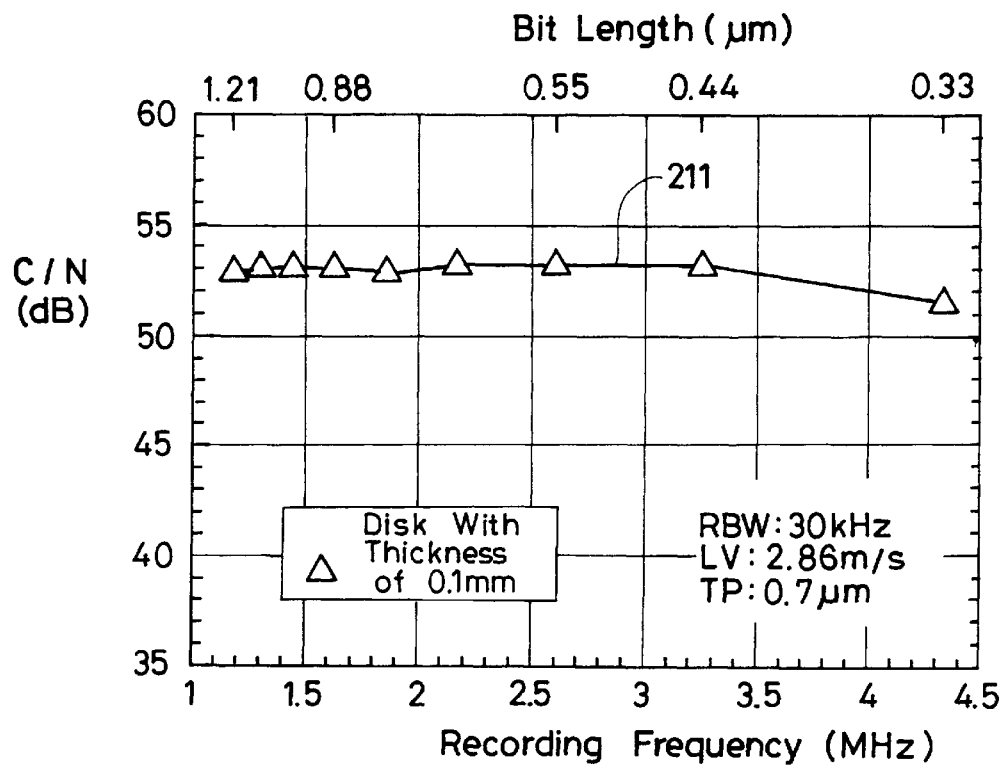
FIG. 13 is a graph illustrating the relationship between recording frequency (MHz) and carrier-to-noise ratio (C/N) of an optical disk.

In another example, the reflective film 203 of the aforedescribed optical disk was formed by DC sputtering of Au so as to have a thickness of 60 nm. An information signal was recorded on a groove with a bit length being varied under the condition of a recording laser power of 6 mV, an erasure laser power of 2.7 mW and a reproduction laser power of 0.5 mW and a linear velocity of 2.86 m/s, and thereafter the recorded information signal was reproduced. Curve 211 of FIG. 13 shows the relationship between the recording frequency (MHz) and the carrier-to-noise ratio (C/N) obtained on the resulting optical disk. FIG. 13 evidences that when the reflective film is formed by DC sputtering of Au, satisfactory signal characteristics are obtained.

Figure 14:
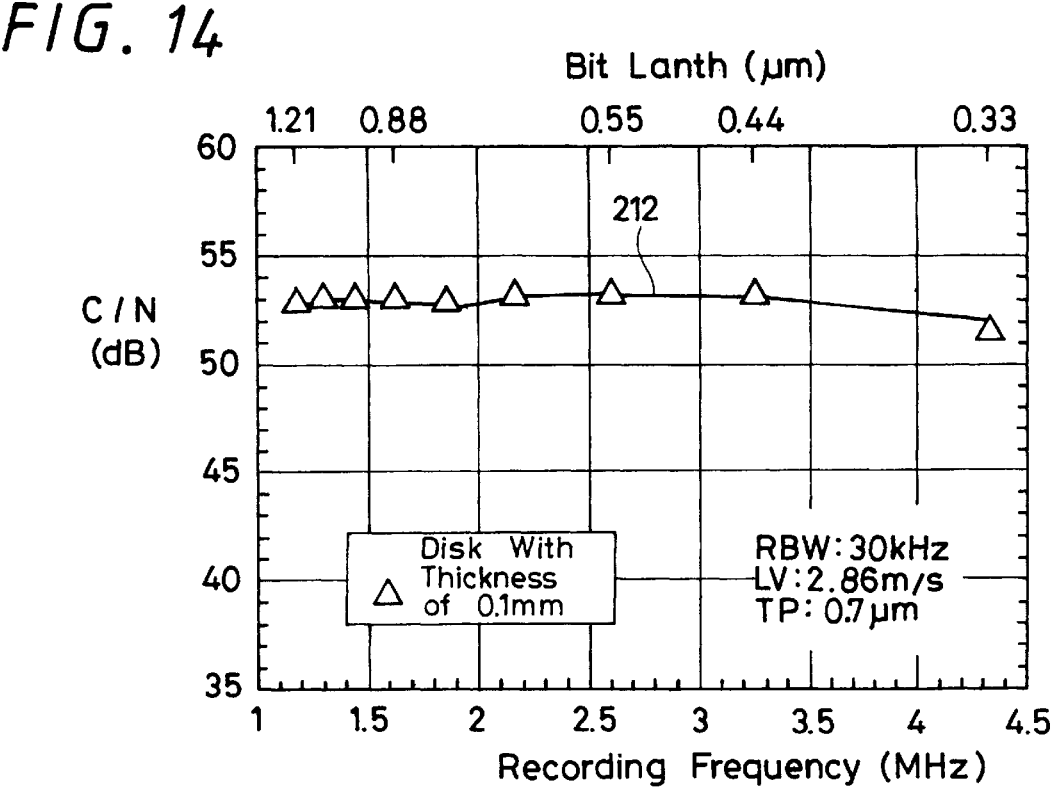
FIG. 14 is a graph illustrating the relationship between recording frequency (MHz) and carrier-to-noise ratio (C/N) of an optical disk.

In a further example, the reflective film 203 of the aforementioned optical disk was formed by DC sputtering of an alloy containing Al of 97% by weight and Ti of 3% by weight so as to have a thickness of 60 nm. An information signal was recorded on a groove with a bit length being varied under the condition of a recording laser power of 6 mV, an erasure laser power of 2.7 mW and a reproduction laser power of 0.5 mW and a linear velocity of 2.86 m/s, and thereafter the recorded information signal was reproduced. Curve 212 of FIG. 14 shows the relationship between the recording frequency (MHz) and the carrier-to-noise ratio (C/N) obtained on the resulting optical disk. FIG. 14 evidences that when the reflective film is formed by DC sputtering of an alloy containing Al of 97% by weight and Ti of 3% by weight, satisfactory signal characteristics are obtained.

Figure 15:
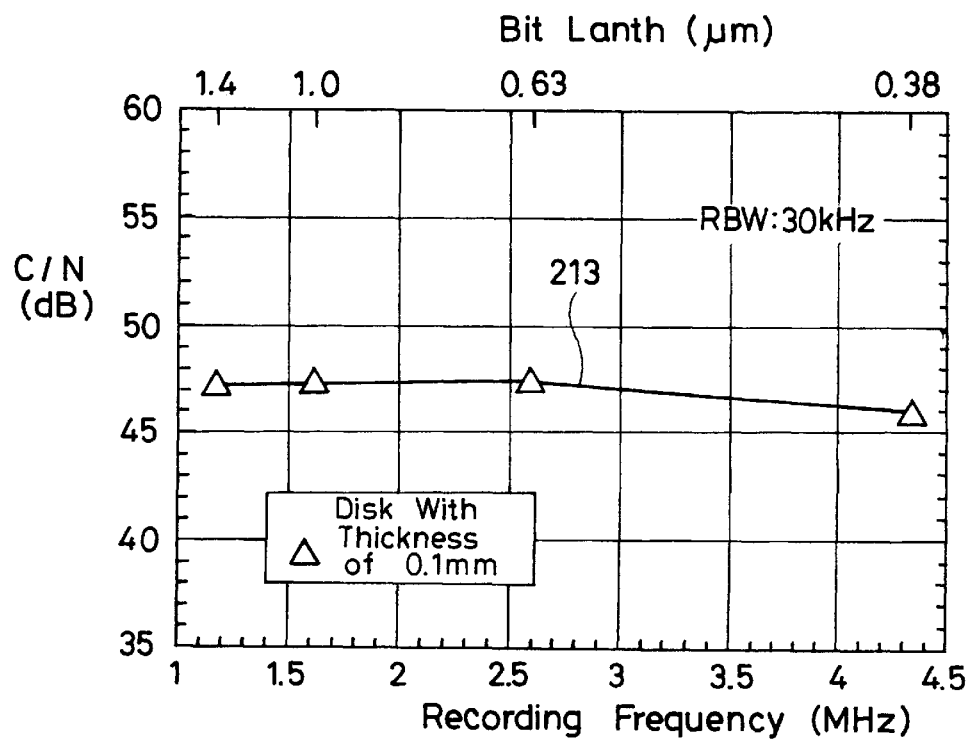
FIG. 15 is a graph illustrating the relationship between recording frequency (MHz) and carrier-to-noise ratio (C/N) of an optical disk.

As a comparative example, the reflective film 203 of the aforedescribed optical disk was formed by DC sputtering of Al so as to have a thickness of 60 nm. An information signal was recorded on a groove with a bit length being varied under the condition of a recording laser power of 6 mV, an erasure laser power of 2.7 mW and a reproduction laser power of 0.5 mW and a linear velocity of 2.86 m/s, and thereafter the recorded information signal was reproduced. Curve 213 of FIG. 15 shows the relationship between the recording frequency (MHz) and the carrier-to-noise ratio (C/N) obtained on the resulting optical disk. FIG. 15 evidence that when the reflective film is formed by DC sputtering of Al, the superior signal characteristics of the resulting optical disks of FIG. 12–14 cannot be obtained.

FIGS. 12 to 15 shows that when the reflective film of the optical disk according to the present invention is formed by ion beam sputtering of Al, by DC sputtering of Au or by DC sputtering of an alloy containing Al of 97% by weight and Ti of 3% by weight, acceptable signal characteristics can be obtained. In contrast, when the reflective film of the optical disk according to the present invention is formed by DC sputtering of Al, satisfactory signal characteristics cannot be obtained.

Moreover, if the reflective film is formed by DC sputtering of Au or an alloy of Al and Ti, then the manufacturing costs of the optical disk are reduced as compared with those of the optical disk whose reflective film is formed by ion beam sputtering.

Figure 16:
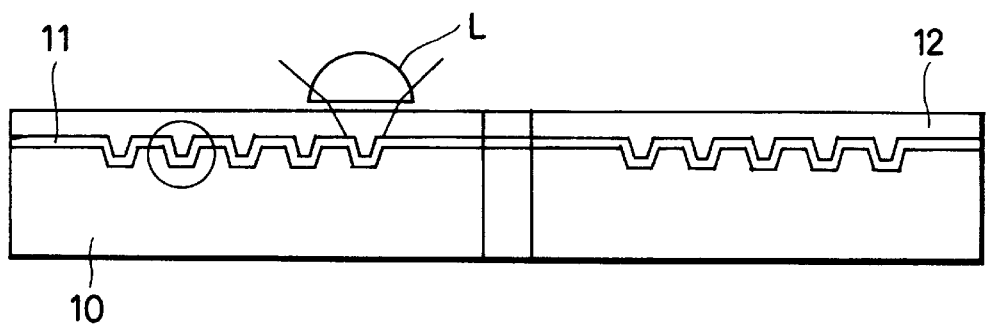
FIG. 16 is a schematic, cross-sectional view showing a preferred embodiment of an optical recording medium according to a first embodiment of the present invention.
Figure 22:
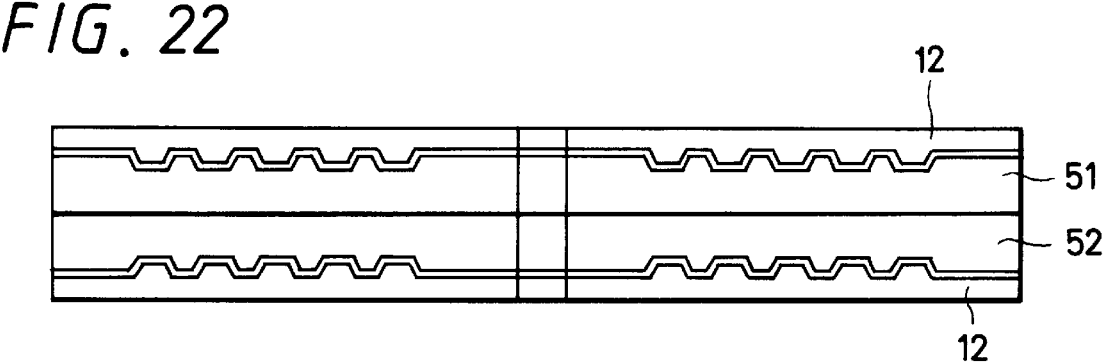
FIG. 22 is a schematic, cross-sectional view illustrating a sixth preferred embodiment of an optical recording medium in accordance with the teachings of the present invention which has a dilayer structure.

A method of manufacturing an optical disk having an optical recording medium according to a first embodiment of the present invention will be now described with reference to the accompanying drawings. As is shown in FIG. 16, if the optical recording medium is formed of a single plate, the substrate 10 must have a certain rigidity. Accordingly, the substrate 10 must have a thickness of about 0.6 mm or more. As is shown in FIG. 22, if an optical recording medium having two substrates bonded to each other is manufactured, then the preferable thickness for each substrate is about 0.3 mm.

FIG. 16 shows that an information recording portion 11 formed of a phase-change recording film or a reflective film which is formed on a guide groove on the substrate 10. For example, if the optical disk is of a ROM type, a reflective film formed of Al or the like is deposited so as to have a thickness of about 20 to 60 nm.

The phase-change recording film can be formed by using chalcogenite, i.e., a chalcogen compound or a chalcogen signal substrate. Since substances such as The and Se and chalcogenite system materials such as GeTe, $Sb_2Te_3$, $Sb_2Se_3$, $GeSb_2Te_4$, $GeSb_4T_7$, $GeSb_2Te_5$, GCeSbTeSe, InSbTe, AgInSbTe, $TeO_x$, or InSe or other chalcogenite system materials. The reflective film formed of an Al film or the like is formed on the guide groove and then the phase-change recording film is formed on the reflective film.

Figure 17:
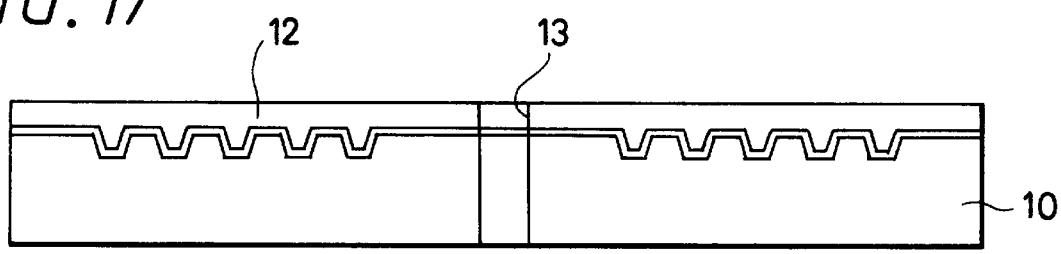
FIG. 17 is a further schematic, cross-sectional view illustrating an optical recording medium of FIG. 16.

Since the phase change signal according to the present invention is recorded and reproduced by irradiation of recording and reproducing light through a recording and reproducing objective lens from a side opposite to the substrate 10, as shown in FIG. 17, a light transmissive layer 12 made of ultraviolet curing resin is deposited on the phase-change recording film 11.

The light transmissive layer 12 can be formed by dropping liquid ultraviolet curing resin on a film forming surface of the substrate, spin coating the resin and then curing the resin by irradiation of light. In the preferred embodiment, the ultra-violet resin has a viscosity ranging from 300 cps to 30000 cps, if the light transmissive layer 12 has the above thickness.

In one example, an ultraviolet curing resin is utilized having a viscosity of 5800 cps at 25° C. with the ultraviolet curing resin being dropped on the substrate and then the substrate being rotated at a speed of 2000 rpm for eleven seconds. In this example, light transmissive layer 12 is formed having a thickness of about 100 µm.

When the light transmissive layer 12 is formed by using a liquid ultraviolet curing resin, if the liquid ultraviolet resin is dropped at an inner periphery portion of the substrate 10 (e.g., at a position radially inwardly of the disk center by at least 25 mm), and then spin coated, the thickness at the inner periphery is different from that at the outer periphery due to the relationship between centrifugal force and viscous resistance. The difference may amount to 30 µm or more, and hence cannot satisfy the above-mentioned tolerance of the desired thickness.

In order to avoid this disadvantage, a center aperture of the substrate, such as 13 in FIG. 17, is formed with the ultraviolet curing resin being dropped at the center portion 13 of the substrate 10. For example, a polycarbonate sheet having a thickness of 0.1 mm is processed so as to have a circular shape with a diameter Φ of 30 nm and the center aperture 13 bonded thereto. Then, the ultraviolet curing resin is dropped and then cured by irradiation of ultraviolet rays, and thereafter, the center aperture is punched again.

According to this method, the difference between thicknesses of light transmissive layer 12 at the inner and outer peripheries thereof is reduced to 10 µm (p—p) or less.

In order to prevent the light transmissive layer 12 from projecting from the outermost periphery of the optical disk during formation thereof, it is desirable to set 120 mm+5 mm as a maximum value of a diameter of the optical disk with reference to a diameter (120 mm) of the CD and the like.

Figure 18:
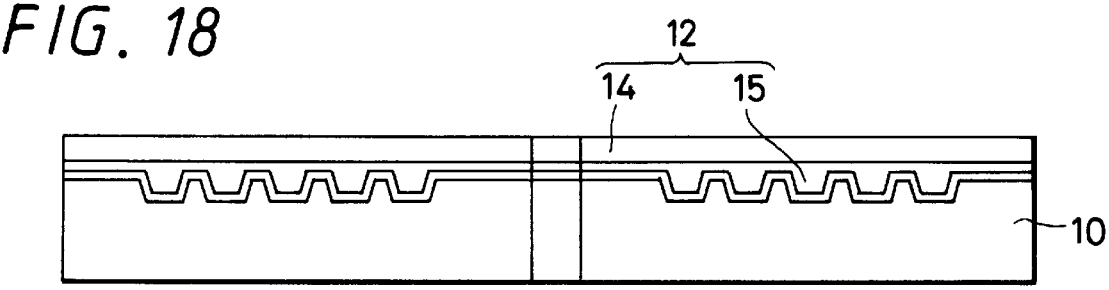
FIG. 18 is a schematic, cross-sectional view illustrating a second preferred embodiment of an optical recording medium in accordance with the teachings of the present invention.

FIG. 18 shows an optical recording medium according to a second embodiment of the present invention. In the embodiment of FIG. 18, the light transmissive layer 12 can be formed by laminating a polycarbonate sheet 14 having a thickness of 100 μm, for example, through a liquid ultraviolet curing resin 15.

In this case, unevenness of the thickness of the light transmissive layer 12 formed of the polycarbonate sheet 14 and bonded by the liquid ultraviolet curing resin 15 can be reduced to approximately 10 μm by disposing the polycarbonate sheet 14 (having the same diameter as that of the substrate 10) on the substrate 10 through the ultraviolet curing resin 15 and spin coating the ultraviolet curing resin 15. At the same time, the polycarbonate sheet 14 acts as a weight for the ultraviolet curing resin 15 during spin coating thereof.

Figure 19:
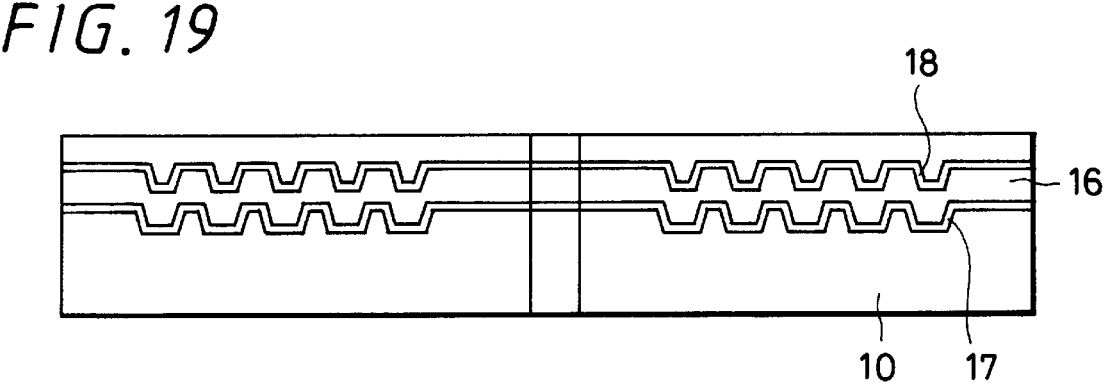
FIG. 19 is a schematic, cross-sectional view illustrating a third preferred embodiment of an optical recording medium in accordance with the teachings of he present invention which has a dilayer structure.

FIG. 19 shows an optical recording medium according to a third embodiment of the present invention. As is shown in FIG. 19, the present invention can be applied to a multilayer optical recording medium having a second information recording layer 18 formed through an intermediate layer 16 on a first information recording layer 17 formed by injection molding of the substrate 10.

Figure 20:
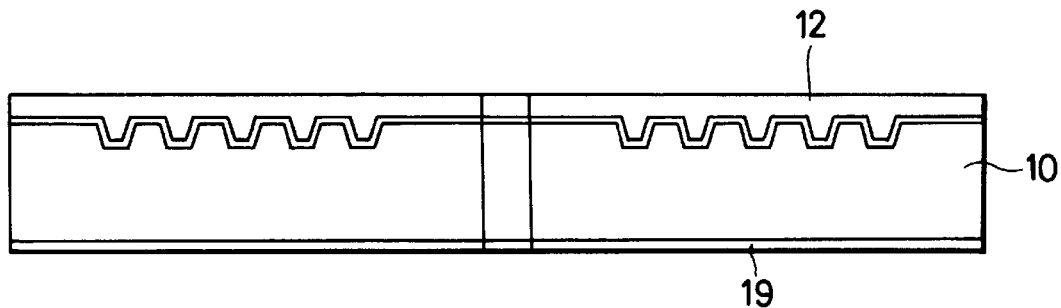
FIG. 20 is a schematic, cross-sectional view illustrating a fourth preferred embodiment of an optical recording medium in accordance with the teachings of the present invention.

A skew (e.g., bend or warp) tends to occur easily in the optical disk having the above structure. FIG. 20 shows an optical recording medium according to a fourth embodiment of the present invention, which in order to reduce the skew, ultraviolet curing resin is coated as a skew correction member 19 on a surface of the base 10 opposite to the side of the light transmissive layer 12.

The skew correction member 19 may be formed by using the same material as that of the light transmissive layer 12 or by using a material having a higher ratio of shrinkage after curing as compared with that of the material of the light transmissive layer 12.

In order to record and reproduce signals with a high recording density optical recording medium, an optical pickup having an objective lens with a relatively high numerical aperture (N.A.) to be later described is required. In this case, the distance (hereinafter referred to as the working distance (W.D.)) between the objective lens and the light transmissive layer surface must be narrower as compared with the distance employed in an ordinary pickup. However, as a result of this narrower working distance, the objective lens may collide with the light transmissive layer surface and hence damage it.

Figure 21:
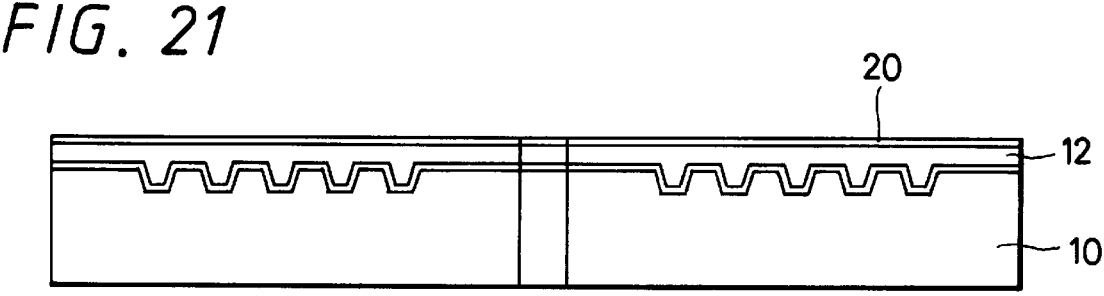
FIG. 21 is a schematic, cross-sectional view illustrating a fifth preferred embodiment of an optical recording medium in accordance with the teachings of the present invention.

FIG. 21 shows an optical recording medium according to a fifth embodiment of the present invention designed to prevent this damage resulting from such collisions. In order to prevent this damage, a protective transparent layer 20 is provided on the light transmissive layer having a hardness greater than a pencil hardness H.

If the light transmissive layer 12 is made thinner, it tends to easily absorb dusts. Therefore, it is effective for the protective transparent layer 20 to have an antistatic capability in order to avoid such adsorption of dust particles and other foreign materials.

The present invention is not limited to an optical recording medium having a single substrate structure. FIG. 22 shows a sixth embodiment of the present invention wherein the optical recording medium has two substrates 51 and 52 bonded to each other each having half of the thickness of the resulting substrate 50.

Figure 23:
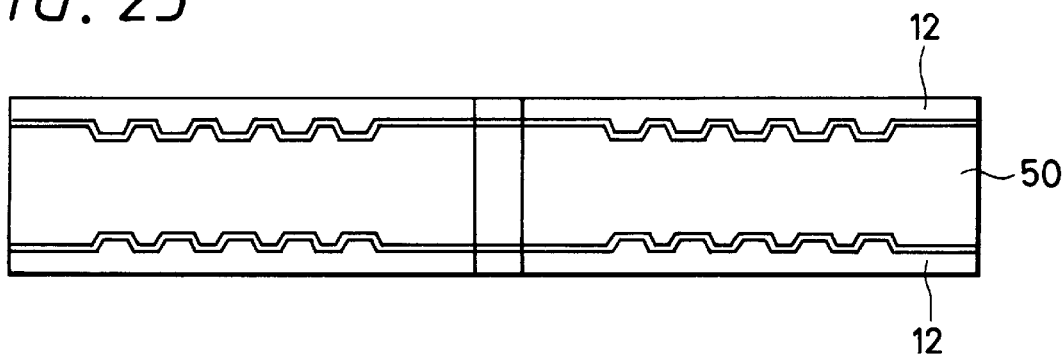
FIG. 23 is a schematic, cross-sectional view illustrating a seventh preferred embodiment of an optical recording medium in accordance with the teachings of the present invention wherein information recording layers are formed on both surfaces of the substrate.

FIG. 23 shows a seventh embodiment of the present invention wherein the optical recording medium has a signal recording layer and a light transmissive layer 12 which are respectively provided on both sides of a single substrate 50.

The optical recording medium according to the present invention can also be manufactured in accordance with the following method.

As shown in FIG. 24A, a polycarbonate sheet 40 having a thickness of approximately 100 μm is manufactured by extrusion or casting. A stamper 41 heated to a temperature higher than the glass transition point and a roller 42 are pressed against the sheet 40 with a pressure of approximately 280 Kgf, for example.

After the above operation, the sheet 40 is processed by the stamper 41 so as to have a predetermined size whereby a thin substrate 43 with the transferred pits or guide grooves of the stamper 41 is created as shown in FIG. 24B.

Subsequently, the reflective film and the phase-change recording layer are formed on the guide groove by a process similar to the above-mentioned manufacturing method.

Thereafter, the ultraviolet curing resin is dropped on a disk-shaped transparent substrate 50 independently manufactured by injection molding. The thin substrate 43 is mounted on the transparent substrate 50 and then pressed thereon. Ultraviolet rays are irradiated from the side of the transparent substrate 50 so that the transparent substrate 50 and the thin substrate 43 are bonded to each other. Thus, an optical recording medium respectively having one, two and four recording layers as shown in Figs. 24C, 24D and 24E can be manufactured.

The formation of a pit or its associated depth on the substrate will now be described. For this purpose, it is assumed that the refractivity of the light transmissive layer is N. A depth of a pit or groove in which the highest modulation can be obtained is $(\lambda/4)/N$. A depth of a pit or a groove in the optical recording medium or ROM type and the like is set to the above value.

If in the groove recording or the land recording a tracking error signal is obtained by a push-pull operation, a push-pull signal becomes maximum when the depth of the pit or the groove is $(\lambda/8)/N$.

Moreover, if a signal is recorded on both the land and the groove, then the groove depth must be determined in view of the characteristics of the servo signal and of the crosstalk and cross-erasure characteristics. Experimental results indicate that the crosstalk is minimized when the groove depth is within the range from between $(\lambda/6)/N$ to $(\lambda/3)/N$ and the cross-erasure is less influential as the groove deepens. If both the crosstalk and cross-erasure characteristics are satisfied in consideration of the groove inclination and the like, both of the characteristics become optimum when the depth is $(3/8\lambda)/N$. The high-recording-density optical recording medium according to the present invention can be applied to an optical recording medium having a groove depth in the above range.

Figure 25:
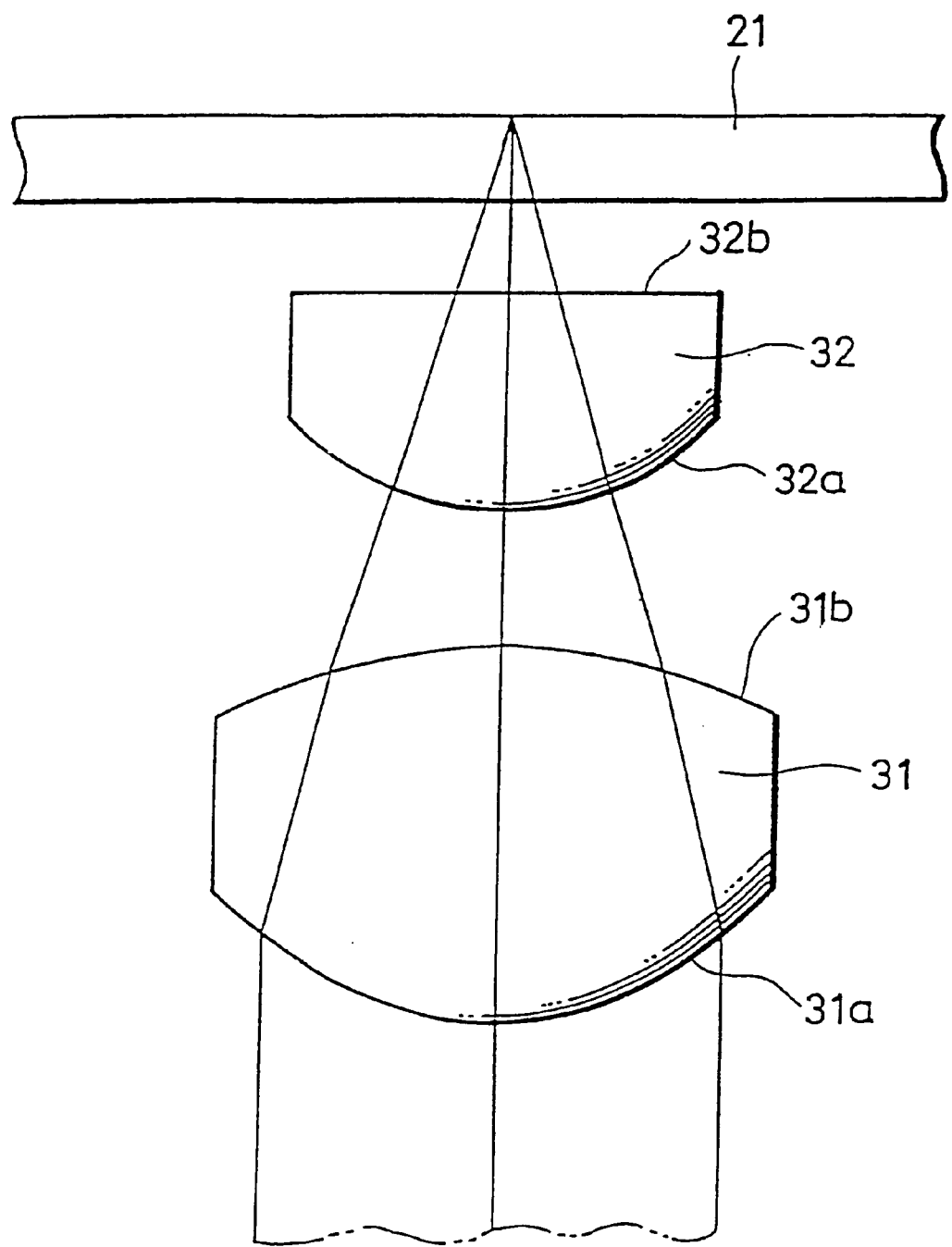
FIG. 25 is a schematic diagram illustrating a two-element lens assembly employed in an optical system for recording and/or reproducing the optical disk according to the present invention.

An optical arrangement for obtaining a higher numerical aperture (N.A.) will now be described. FIG. 25 shows an arrangement of lenses of an optical disk apparatus for obtaining a higher value of the numerical aperture (N.A.), i.e., an arrangement of a two-element lens thereof.

It is assumed that the optical disk apparatus shown in FIG. 25 has a laser light source emitting laser light having a wavelength of about 680 nm.

As is shown in FIG. 25, the optical disk apparatus has a second lens 32 provided between a first lens 31 and a disk 21. Since the optical disk apparatus has a two-element lens arrangement, it is possible to set the numerical aperture (N.A.) to 0.7 or more, and it is also possible to narrow the interval (W.D.) between a first plane 32a of the second lens 32 and a surface of the disk 21. It is desirable to form a first plane 31a, a second plane 31b, a third plane 32a and a fourth plane 32b of the first and second lenses 31 and 32 as aspherical planes.

Since the two-element lens arrangement is employed, it is possible to record and reproduce the above optical recording medium with high recording density.

In accordance with one of its general objects, the phase-change type optical recording medium of the present invention can obtain a storage capacity of at least 8 GB.

Moreover, a phase-change type optical recording medium having excellent signal characteristics is obtained by adjusting the composition of the reflective film and the method of forming the film.

According to the present invention, since the duty ratio of the concave portion of the guide groove structure on the substrate is adjusted, even if the phase change recording layer and the reflective layer are formed on the guide groove structure, an optical recording medium can be obtained wherein the concave portion (land) of the guide groove structure and the convex portion (groove) thereof are formed so that a ratio of the width of the concave portion at the phase-change recording film to that of the convex portion is set at a desired ratio.

Moreover, the present invention allows the optical recording disk to have a higher recording capacity as compared with that of known disks even when a relatively simple recording and reproducing apparatus is used.

Having described preferred embodiments of the present invention with reference to the accompanying drawings, it is to be understood that the present invention is not limited to the above-mentioned embodiments and that various changes and modifications may be made therein by one skilled in the art without departing from the spirit or scope of the present invention as defined in the appended claims.

What is claimed is:

1. An optical recording disk for storing data therein, said optical recording disk being adaptable for use with an optical disk recording and reproducing apparatus, the optical disk comprising:

a base;

a guide groove formed on said base;

a recording area formed at least of a phase-change recording layer on said guide groove; and a light transmissive layer formed on at least said recording area and having a thickness ranging from between approximately 3 to 177 μm, wherein the unevenness of the thickness of said light transmissive layer is set within the range of:

$$\Delta t \leq \pm 5.26(\lambda/\text{N.A.}^4)(\mu m)$$

wherein N.A. represents a numerical aperture of an optical head device of said optical disk recording and/or reproducing apparatus and λ represents the wavelength of a laser light utilized by said optical disk recording and/or reproducing apparatus.

2. The optical recording disk of claim 1, wherein said recording area is also formed of a reflective film.

3. The optical recording disk of claim 2, wherein said reflective film is formed by ion beam sputtering of Al.

4. The optical recording disk of claim 2, wherein said reflective film is formed by ion beam sputtering of an Al alloy.

5. The optical recording disk of claim 2, wherein said reflective film is formed by DC sputtering of Au.

6. The optical recording disk of claim 2, wherein said reflective film is formed by DC sputtering of an Al alloy containing Cr of between approximately 0.5 to 10% by weight.

7. The optical recording disk of claim 2, wherein said reflective film is formed by DC sputtering of an Al alloy containing Ti of between approximately 0.5 to 10% by weight.

8. The optical recording disk of claim 2, wherein said reflective film is formed by DC sputtering of an Al alloy containing Ti of between approximately 3.0 to 10% by weight.

9. The optical recording disk of claim 1, wherein said recording area further comprises first and second dielectric layers formed between said phase-change recording film, and a reflective film formed as part of said recording area.

10. The optical recording disk of claim 9, wherein said reflective film is formed by ion beam sputtering of Al and has a thickness of between approximately 50 to 200 nm, said first dielectric layer is formed of a mixture of ZnS and $SiO_2$ and has a thickness of between approximately 10 to 30 nm, said phase-change recording film is formed of GeSbTe and has a thickness of between approximately 10 to 30 nm, and said second dielectric layer is formed of a mixture of ZnS and $SiO_2$ and has a thickness of between approximately 50 to 200 nm.

11. The optical recording disk of claim 9, wherein said reflective film is formed by ion beam sputtering of an Al alloy and has a thickness of between approximately 50 to 200 nm, said first dielectric layer is formed of a mixture of ZnS and $SiO_2$ and has a thickness of between approximately 10 to 30 nm, said phase-change recording film is formed of GeSbTe and has a thickness of between approximately 10 to 30 nm, and said second dielectric layer is formed of a mixture of ZnS and $SiO_2$ and has a thickness of between approximately 50 to 200 nm.

12. The optical recording disk according to claim 9, wherein said reflective film is formed by ion beam sputtering of Au and has a thickness of between approximately 50 to 120 nm, said first dielectric layer is formed of a mixture of ZnS and $SiO_2$ and has a thickness of between approximately 10 to 30 nm, said phase-change recording film is formed of GeSbTe and has a thickness of between approximately 10 to 30 nm, and said second dielectric layer is formed of a mixture of ZnS and $SiO_2$ and has a thickness of between approximately 50 to 200 nm.

13. The optical recording disk of claim 1, wherein a signal is recorded on and reproduced from only a land, and said land is formed on said base.

14. The optical recording disk of claim 1, wherein a signal is recorded on and reproduced from both a land and a groove of said guide groove, and said guide groove is formed on said base so that a duty ratio of its groove portion as viewed from said light transmissive layer side thereof is within the range of between approximately 58 to 75%.

15. The optical recording disk of claim 1 wherein said base is formed of thermoplastic resin.

16. The optical recording disk of claim 1 wherein said base has a thickness ranging from between approximately 0.3 to 1.2 mm.

17. An optical disk apparatus for recording or recording and reproducing an optical recording disk having a base, a guide groove structure formed on the base, a recording area formed at least of a phase-change recording layer on the guide groove, and a light transmissive layer formed over at least said recording area which has a thickness ranging from between approximately 3 to 177 μm, said optical disk apparatus comprising:

a laser light source for emitting a laser having a wavelength of 680 nm or less; and an optical lens arrangement having a numerical aperture (N.A.) of approximately 0.7° or more for converging the laser at a signal recording surface of said optical disk.

18. The optical disk apparatus of claim 17 wherein the base of the optical recording disk is formed of thermoplastic resin.

19. The optical disk apparatus of claim 17 wherein the base of the optical recording disk has a thickness ranging from between approximately 0.3 to 1.2 mm.

20. The optical disk apparatus of claim 17 wherein said recording area is also formed of a reflective film.

* * * * *